(12) United States Patent  (10) Patent No.: US 7,357,328 B2
Bouvard  (45) Date of Patent: Apr. 15, 2008

(54) CONTACT-FREE MICROCIRCUIT CARD INCORPORATING A KEYBOARD AND METHOD FOR USING SAME

(75) Inventor: Jérôme Bouvard, Ouistreham (FR)

(73) Assignee: Oberthur Technologies, Paris (FR)

( * ) Notice: Subject to any disclaimer, the term of this patent is extended or adjusted under 35 U.S.C. 154(b) by 411 days.

(21) Appl. No.: 10/494,283

(22) PCT Filed: Oct. 30, 2002

(86) PCT No.: PCT/FR02/03740

§ 371 (c)(1),
(2), (4) Date: Aug. 30, 2004

(87) PCT Pub. No.: WO03/038742

PCT Pub. Date: May 8, 2003

(65) Prior Publication Data

US 2005/0015627 A1  Jan. 20, 2005

(30) Foreign Application Priority Data

Nov. 2, 2001 (FR) .................................. 01 14226

(51) Int. Cl.
*G06K 19/06* (2006.01)

(52) U.S. Cl. .................. 235/492; 235/379; 235/380
(58) Field of Classification Search ................ 235/492, 235/451; 705/44
See application file for complete search history.

(56) References Cited

U.S. PATENT DOCUMENTS

| 4,851,654 A  * | 7/1989 | Nitta ........................... 235/492 |
| 5,734,722 A | 3/1998 | Halpern |
| 6,073,856 A  * | 6/2000 | Takahashi .................... 235/492 |
| 6,340,116 B1 * | 1/2002 | Cecil et al. .................. 235/492 |
| 6,367,702 B1 * | 4/2002 | Dietrich et al. ............. 235/492 |
| 2003/0075610 A1* | 4/2003 | Ong ........................... 235/492 |

FOREIGN PATENT DOCUMENTS

| DE | 196 04 206 | 8/1997 |
| DE | 100 08 076 | 8/2001 |
| EP | 0 167 044 | 1/1986 |
| WO | WO 00/74008 | 12/2000 |

* cited by examiner

*Primary Examiner*—Seung Ho Lee
(74) *Attorney, Agent, or Firm*—Young & Thompson

(57) ABSTRACT

The invention concerns a contact-free microcircuit card (10) used in combination with a receiver (40) for carrying out an electronic transaction, incorporating a keyboard (12) for inputting data used during the transaction.

10 Claims, 5 Drawing Sheets

CONTACT-FREE MICROCIRCUIT CARD INCORPORATING A KEYBOARD AND METHOD FOR USING SAME

BACKGROUND OF THE INVENTION

1. Field of the Invention

The present invention relates to a microcircuit card of the contact-free type used in conjunction with a receiver to carry out an electronic transaction.

2. Description of the Related Art

In this patent application the expression "electronic transaction" is to be understood in a broad sense, and may in particular refer to a commercial transaction such as obtaining cash from an automatic teller machine as well as diverse applications such as controlling access to a building and loyalty card operations.

Be this as it may, to carry out the transaction, this kind of contact-free microcircuit card cooperates with a unit referred to hereinafter as a "receiver".

Compared to contact microcircuit cards, contact-free microcircuit cards have the advantage of not necessitating physical insertion of the card into the receiver, as a transaction can be carried out when the contact-free card is within a sufficiently small distance of the receiver.

Prior art contact-free microcircuit cards are conventionally used to carry out transactions that do not necessitate identification of the card user by intentionally entering a personal identification number (PIN). This is because this step is not generally necessary for the usual uses of contact-free cards, such as controlling access to a building, for example.

However, in the case of a multiple application card, it may be beneficial to secure certain applications by intentionally entering a personal identification number.

In the case of using a contact card in the manner known in the art, in particular for withdrawing cash, this intentional identification step is carried out by entering a personal identification number on a keypad incorporated in the receiver.

In the case of using a contact-free microcircuit card, the solution consisting in entering this information by means of a keypad incorporated into the receiver is not satisfactory, for a number of reasons.

First of all, this kind of use necessitates intervention of the user at the receiver, which may be a problem in certain applications.

Also, in the case of transactions necessitating a very high level of security, a user may hesitate to enter his personal identification number into a receiver because he is afraid of the number being pirated.

SUMMARY OF THE INVENTION

The present invention enables secure electronic transactions to be carried out with a contact-free electronic card that avoids the problems previously cited.

To be more precise, a first aspect of the present invention provides a contact-free microcircuit card used in conjunction with a receiver to carry out an electronic transaction, characterized in that it incorporates a keypad for entering information used in said transaction.

This kind of microcircuit card, providing for the entry of information by the user by means of the keypad incorporated into the card, avoids the use of the keypad of the receiver and solves the two problems previously cited.

According to one advantageous feature of the microcircuit card, this card includes means adapted to authorize execution of said transaction after validation of a code entered by means of said keypad.

It is thus possible, in the case of a commercial transaction in particular, to enter a personal identification number on the card, which makes it very difficult to pirate the number.

Of course, the keypad on the card may be used to enter any other type of information.

According to another particular feature of the card according to the invention, it comprises a communication antenna enabling said transaction with said receiver, the card being supplied with electrical power at least in part by an induced current received by said antenna and generated by an electromagnetic field generated by said receiver.

This feature is particularly advantageous as it yields a very high security level. This is because the card is supplied with power by an electromagnetic field generated by the receiver and cannot be used as it exits the field if it is moved away from the receiver, for example by a few meters.

In another embodiment, the card includes means for resetting it if communication with said receiver is interrupted for at least a predetermined time period.

This embodiment also makes this kind of card more secure to use and may advantageously be employed if the card is supplied with power autonomously, namely by an extra-thin battery or a solar cell, for example.

According to another feature, the card according to the invention further comprises a screen for checking information entered by means of said keypad.

Of course, this screen may also be used to display information transmitted to the card by the server or any other information that is useful for the transaction.

A second aspect of the present invention provides a process of fabricating a microcircuit card as described briefly hereinabove, the card including a communication antenna allowing said transaction with said receiver.

The fabrication process includes a step of screenprinting in at least one layer producing simultaneously at least one portion of the connection circuit of said keypad and at least one portion of said antenna. Such a process is particularly advantageous in that it makes it possible to reduce the number of stages of fabrication.

This fabrication process allows easy adaptation of a keypad to a conventional contact-free microcircuit card.

According to one particular feature of the fabrication process, the screenprinting step comprises:

applying a first conductive layer for producing a first portion of the connection circuit of the keypad and a first portion of said antenna, placing electrically insulative material bridges over regions of said first portions produced during the application of said first conductive layer, and applying a second conductive layer for completing said connection circuit of the keypad and said antenna, the second conductive layer being insulated from the first conductive layer by means of said insulative material bridges.

The step of placing electrically insulative material bridges between the two steps of applying the conductive layer enables fabrication by screenprinting of relatively complex two-stage circuits.

A third aspect of the invention provides a method of electronic transaction between a microcircuit card as briefly described hereinabove and a receiver, said method includes the following steps:

user authentication means incorporated in said card verifying the validity of a code entered by means of said keypad, and authorizing said transaction as a function of the result of said verification step.

The particular advantages and features specific to this method are identical to those of the microcircuit card of the invention and are not repeated here.

A preferred embodiment of the electronic transaction method according to the invention includes, before said verification step, a step of selecting a secure mode of use of said card as a function of said transaction.

By virtue of this particularly advantageous feature, the contact-free microcircuit card may be used both for secure transactions involving entry of information on the keypad and for transactions that necessitate no such entry. The card is then referred to as a "multiple application card".

Finally, the invention is directed to use of a microcircuit card as described briefly hereinabove in cooperation with a receiver connected to the Internet to carry out a secure electronic transaction on the Internet between said receiver and another unit also connected to the Internet.

This kind of use provides for electronic transactions on the Internet that are very secure because the user's personal identification number is entered on the card and is not transmitted to the receiver.

BRIEF DESCRIPTION OF THE DRAWING FIGURES

Other aspects and advantages of the present invention will become more clearly apparent in the light of the following description of particular embodiments, the description being given by way of nonlimiting example only and with reference to the appended drawings, in which.

DETAILED DESCRIPTION OF THE PREFERRED EMBODIMENTS

Figure 1:
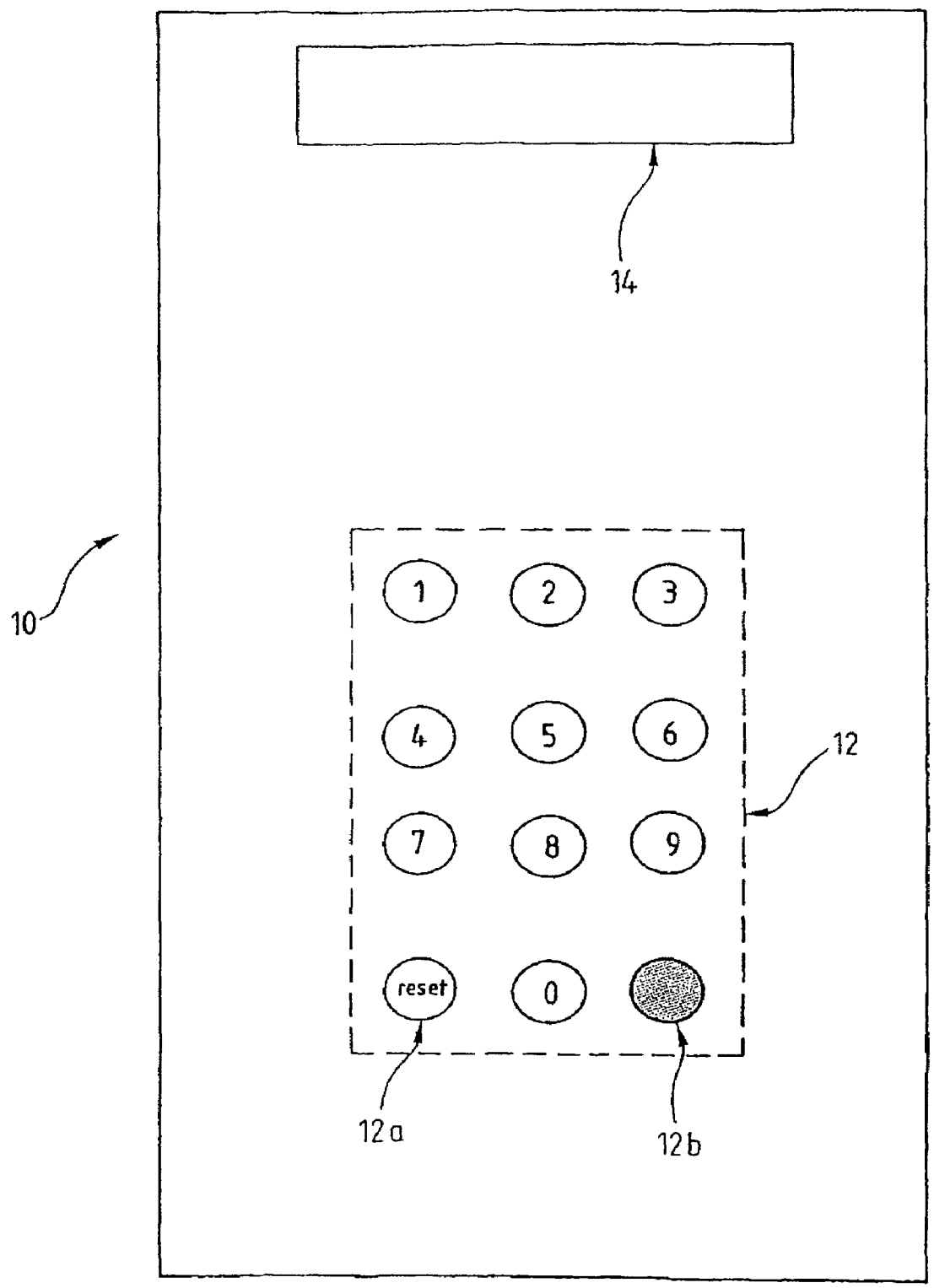
FIG. 1 represents an external face of a microcircuit card of the invention.

FIG. 1 represents a contact-free microcircuit card 10 according to the present invention.

The main steps of a method of fabricating a microcircuit 10 according to the invention are described next with reference to FIG. 1.

The microcircuit card 10 may be used to carry out different types of electronic transaction.

In accordance with the present invention, the microcircuit card incorporates a keypad 12 used during the transaction to enter information.

In the preferred embodiment, the keypad 12 includes keys for entering digits, a key 12a for resetting the information entered by means of the keypad 12, and a validation key 12b.

In another embodiment, not shown, the keypad 12 also includes keys for entering character strings, for example.

The microcircuit card 10 further comprises a screen 14 for checking the information entered by means of the keypad 12.

Figure 2:
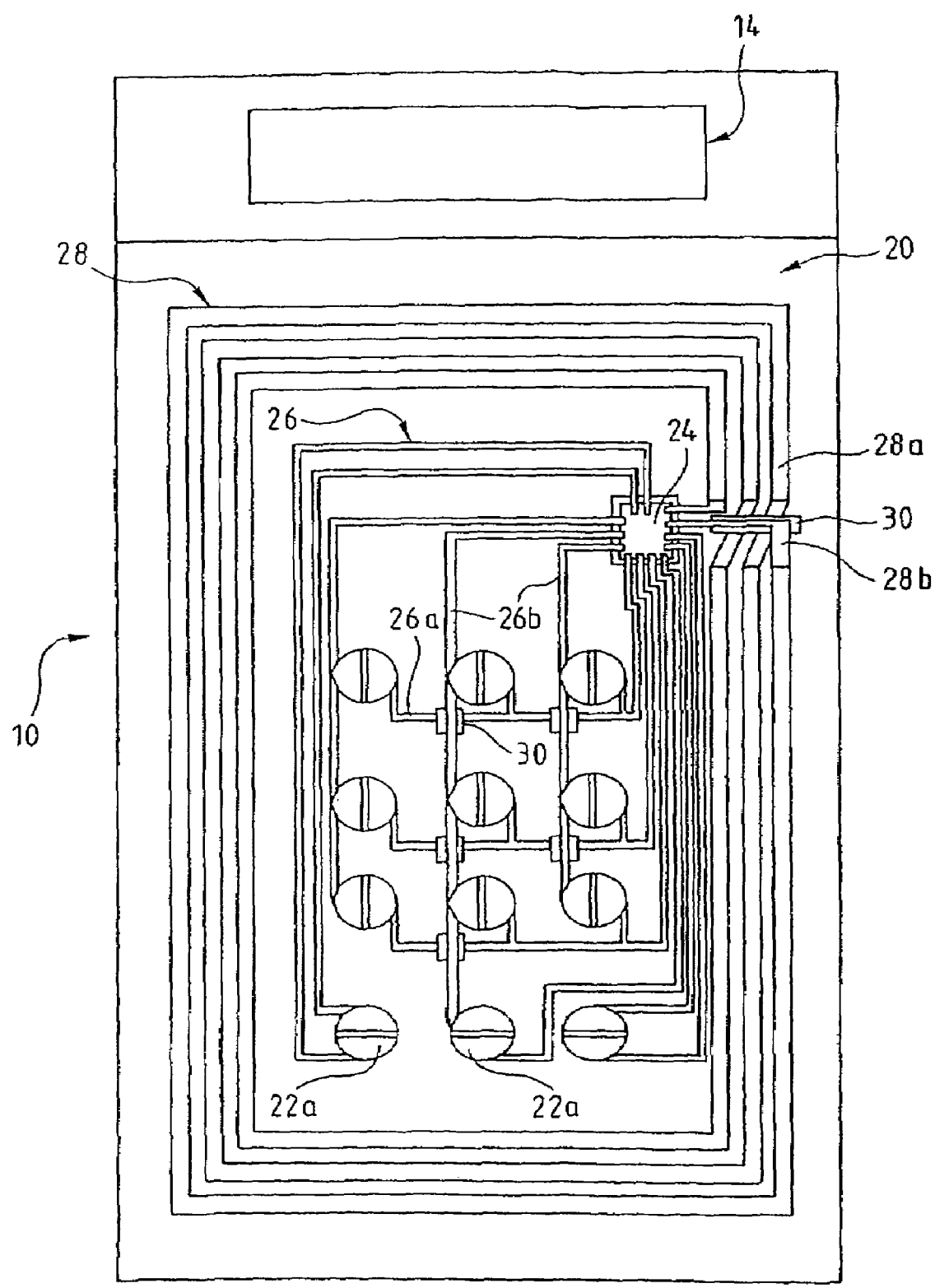
FIG. 2 represents the internal structure of the microcircuit card of FIG. 1.

FIG. 2 represents the internal structure of the microcircuit card 10 represented in FIG. 1.

The main steps of a process for fabricating a microcircuit card 10 according to the invention are described next with reference to FIG. 2.

The microcircuit card 10 includes a printed circuit 20 to which are fixed microswitches 22a facing the keys of the keypad 12.

The microswitches 22a are connected by a connection circuit 26 to a microcircuit 24.

In a manner that is known in the art, the microcircuit 24 comprises processing means consisting of a microprocessor and registers adapted in particular to store instructions of a computer program, for example.

In a preferred embodiment, the microprocessor is adapted, when it executes the instructions of the program, to validate a code entered by means of the keypad 12 and to authorize the execution of a transaction after validation of the code.

The card 10 also includes an antenna 28 connected to the microcircuit 24.

Figure 3A:
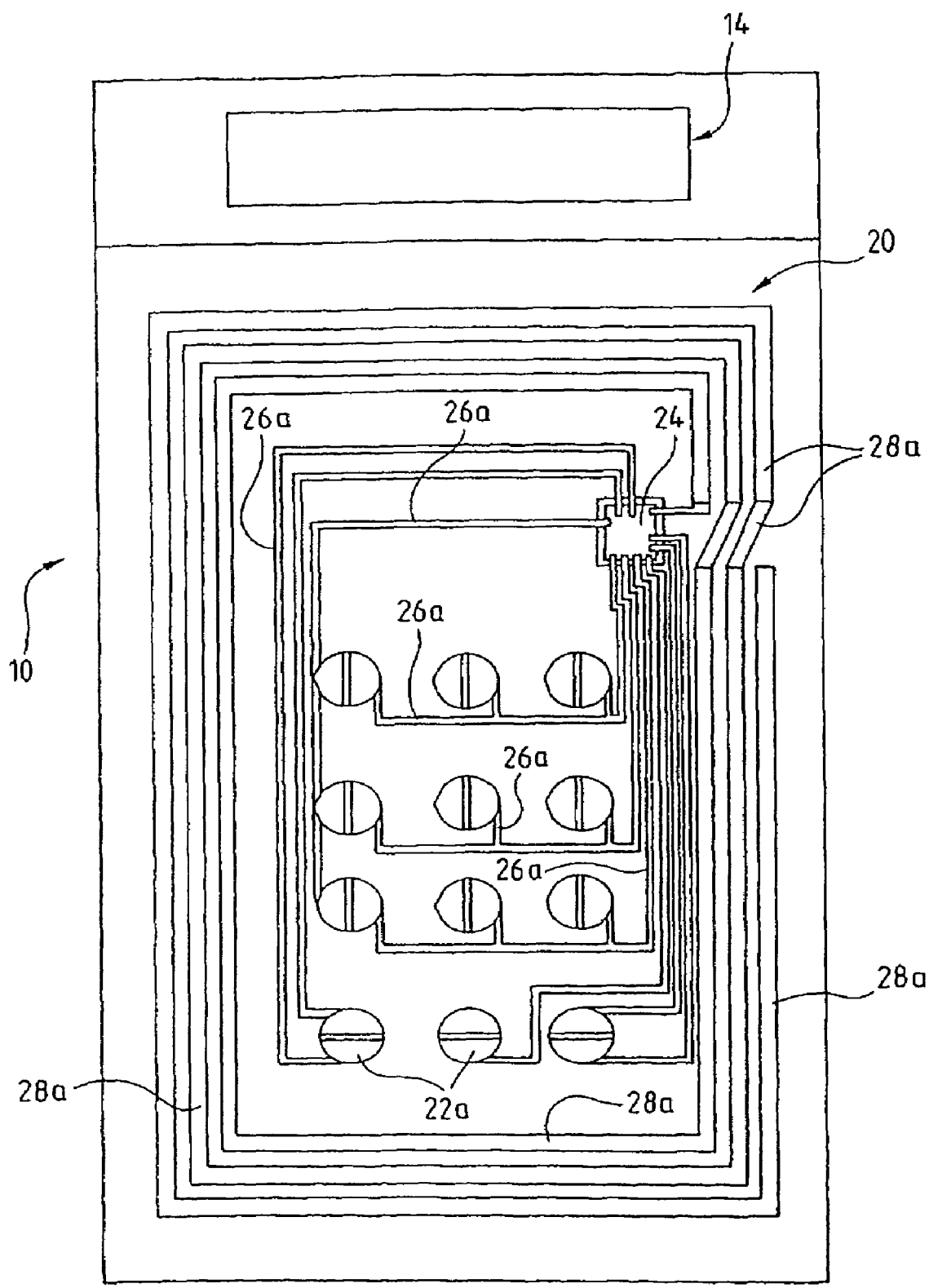
FIGS. 3a and 3b represent the state of the microcircuit card of the invention after intermediate steps of a method of fabricating a microcircuit card of the invention.

The main steps of a method for fabricating a microcircuit card 10 according to the invention are described next with reference to FIGS. 3a and 3b.

A preferred embodiment of the fabrication method includes a screenprinting step for simultaneously producing at least one portion of the connection circuit 28 of the keypad 12 and at least one portion of the antenna 28.

To be more precise, this screenprinting step includes the application of a first conductive layer for producing a portion 26a of the connection circuit 26 of the keypad 12 and a first portion 28a of the antenna 28.

The screenprinting technique for applying a conductive layer to an electronic card is not described here because it is well known to the person skilled in the art.

In the fabrication method of the invention, after applying the first layer, electrically insulative material bridges 30 are placed over regions of the first portions 26a, 28a of the connection circuit 26 and the antenna 28, respectively, produced by the application of the first conductive layer.

Figure 3B:
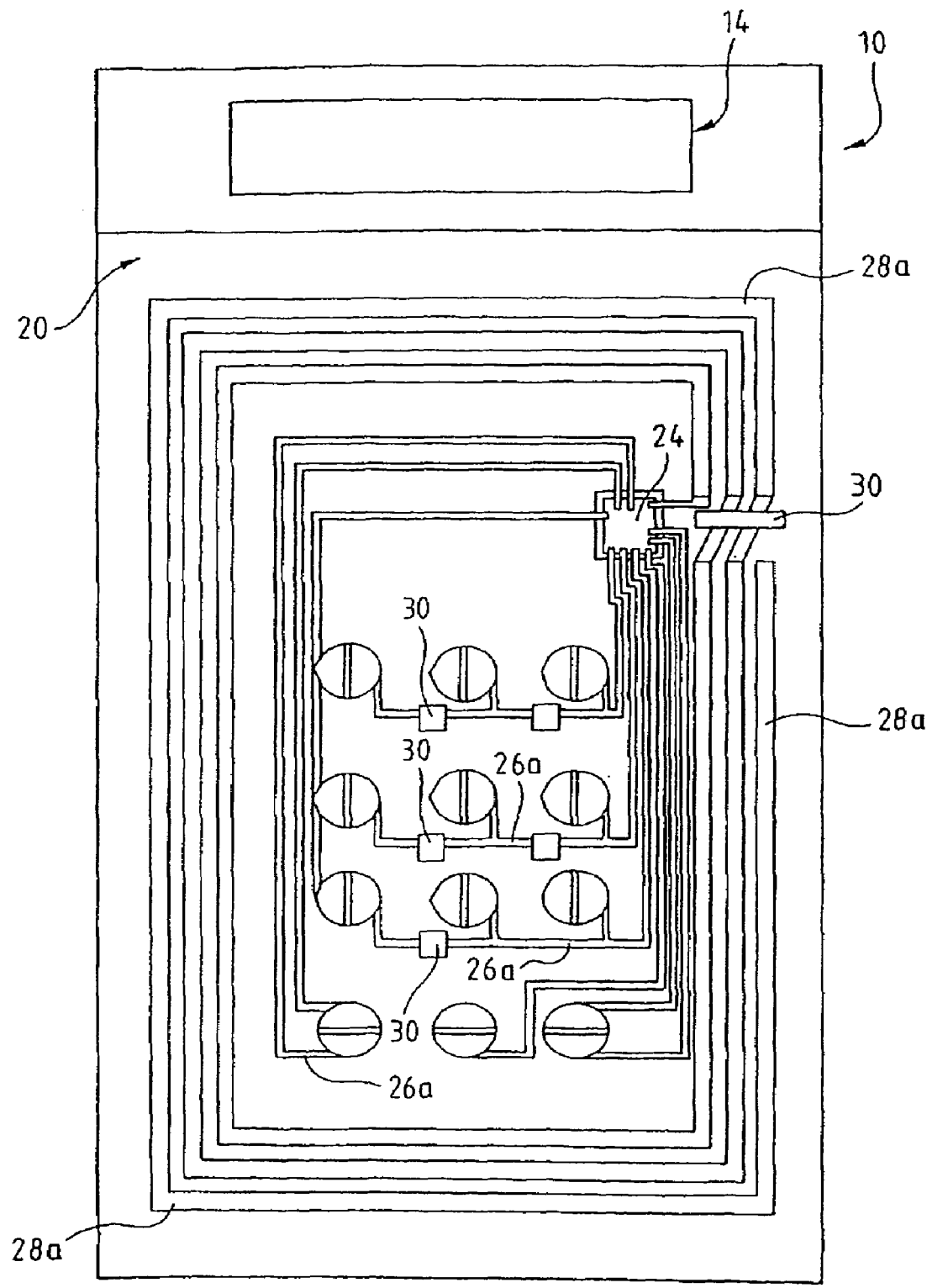

This step of placing the insulative material bridges 30 yields the microcircuit card 10 represented in FIG. 3b.

The fabrication method for the microcircuit card 10 then includes the application of a second conductive layer to complete the connection circuit 26 of the keypad 12 and the antenna 28.

The second conductive layer is insulated from the first conductive layer by the insulative material bridges to prevent short circuits.

This kind of screenprinting is also used to produce an antenna with multiple turns running around the entire perimeter of the card 20.

The application of the second conductive layer terminates the screenprinting step and yields the microcircuit card 10 represented in FIG. 2.

Figure 4:
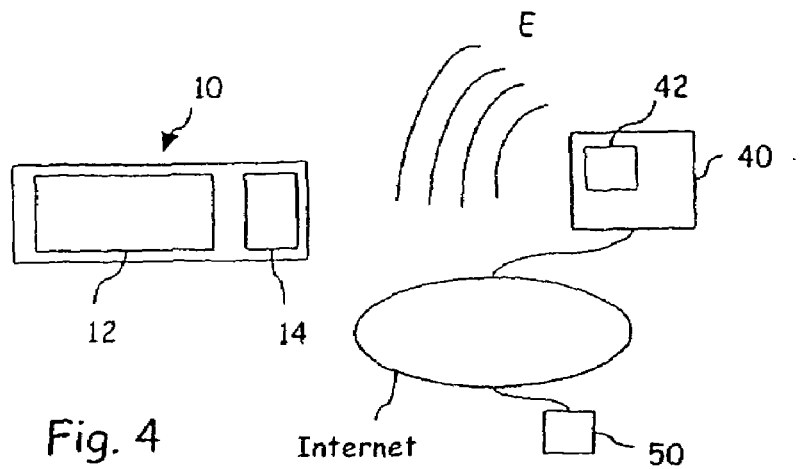
FIG. 4 represents the use of a microcircuit card of the invention to carry out a transaction with a receiver connected to the Internet.

The use of a microcircuit card 10 to carry out a transaction with a receiver 40 connected to the Internet is described next with reference to FIG. 4.

In the preferred embodiment described here, the receiver 40 includes means 42 for generating an electromagnetic field E.

When the card 10 is in the magnetic field E, the antenna 28 picks up a portion of this electromagnetic energy and generates an induced current for supplying electrical power to the microcircuit 24.

In a preferred embodiment, this electromagnetic field E is the only source of power for the microcircuit card 10.

Accordingly, the microcircuit 24 is no longer supplied with power if the microcircuit card 10 leaves the electromagnetic field E, which provides very effective protection of the microcircuit card 10 against fraudulent use.

Figure 5:
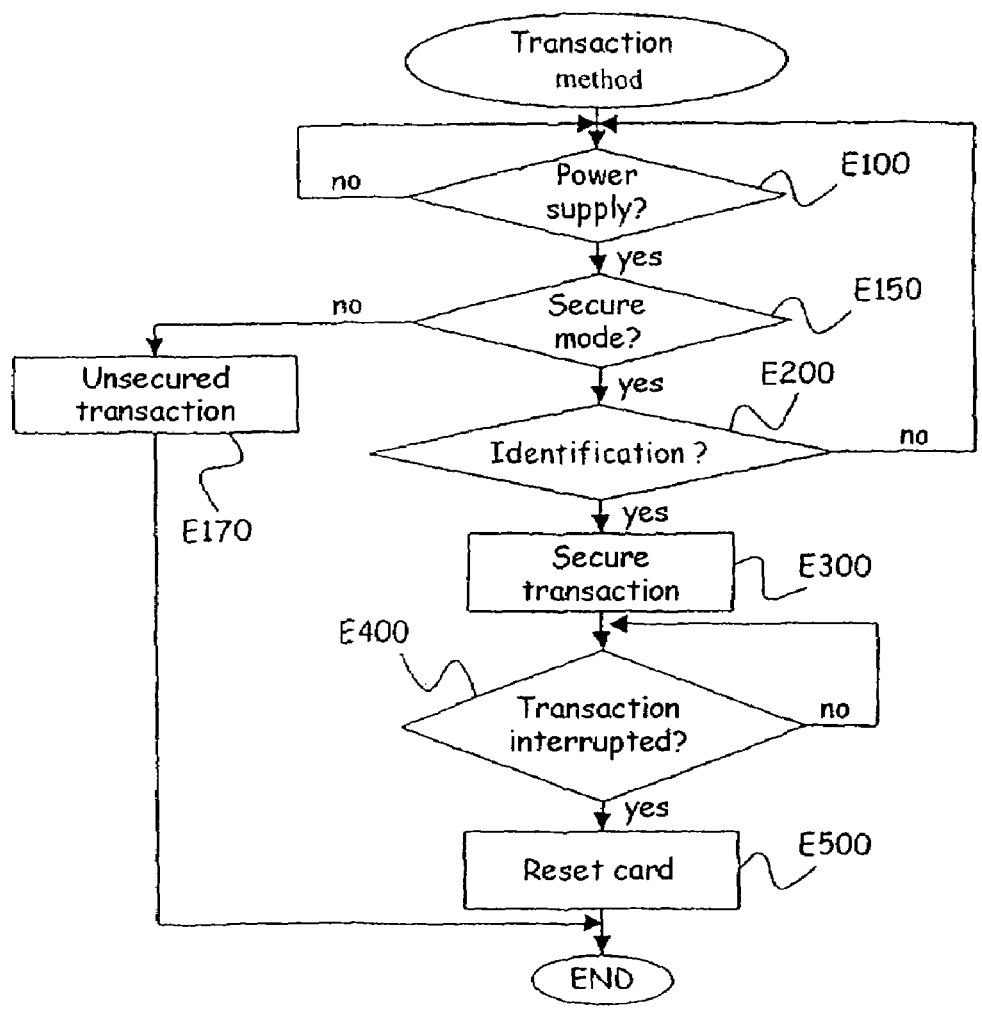
FIG. 5 represents the main steps of an electronic transaction method using a microcircuit card of the invention.

The main steps of an electronic transaction method between the microcircuit card 10 and a unit 50 connected to the Internet are described next with reference to FIG. 5.

As previously described, the microcircuit card 10 is not supplied with power if the card is not in the electromagnetic field E generated by the receiver 40.

When the card enters the electromagnetic field E, the microcircuit 24 is supplied with power and the result of a power supply test step E100 becomes positive.

That step is then followed by a test E150 for selecting a secure mode of use as a function of the transaction.

If the transaction does not require a level of security necessitating the entry of a personal identification number by means of the keypad 12, the result of the test E150 is negative.

This test is then followed, during the step E170, by the transaction proper, after which the method terminates.

On the other hand, if the transaction necessitates the entry of a personal identification number by means of the keypad 12, the result of the test E150 is positive.

This test is then followed by a test E200 to verify the validity of a number entered by the card user by means of the keypad 12.

In one embodiment, this verification step E200 consists in comparing the number entered with a number stored in registers of the microcircuit 24.

In a variant, the user can make more than one attempt to enter a valid number.

If no valid number has been entered after these attempts, the transaction method according to the invention terminates.

On the other hand, as soon as a valid number is entered, the result of the test E200 becomes positive.

The identification test E200 is then followed by a step E300 during which the secure transaction proper starts.

This transaction may be of different types, depending on the type of unit 50 connected to the Internet. It may be a commercial transaction, for example, if the microcircuit card 10 is a payment card.

The step of starting the secure transaction E300 is followed by a test E400 to verify if the transaction has been interrupted.

In this example the transaction is considered to have been interrupted:
if the transaction has terminated normally, or
if the card 10 leaves the electromagnetic field E, or
if communication between the receiver and the card is interrupted for at least a predetermined time period. In practice, as soon as the microcircuit 24 receives data from the receiver 40, it resets a counter (not shown). If the content of this counter exceeds a value representing this predetermined time period, the result of the test E400 becomes positive.

This test is then followed by a step E500 during which the microcircuit 24 resets the microcircuit card 10.

This constitutes an additional security feature to combat fraudulent use of the microcircuit card 10, especially if the card is at least partly supplied with power by a power source other than the electromagnetic field E previously described.

The step E500 of resetting the card 10 terminates the transaction method according to the invention.

The invention claimed is:

1. A contact-free microcircuit card (10) employed in conjunction with a receiver (40) to carry out an electronic transaction, comprising:
   a keypad (12) incorporated in said microcircuit card (10), said keypad (12) being configured to enter information employed in said transaction; and
   means for resetting said microcircuit card (10) if communication with said receiver (40) is interrupted for at least a predetermined time period.

2. The microcircuit card (10) according to claim 1, wherein said microcircuit card (10) includes means (24) adapted to authorize execution of said transaction after validation of a code entered by means of said keypad (12).

3. The microcircuit card according to claim 2, comprising a communication antenna (28) enabling said transaction with said receiver (40), characterized in that said card (10) is supplied with electrical power at least in part by an induced current received by said antenna (28) and generated by an electromagnetic field (E) generated by said receiver (40).

4. The microcircuit card according to claim 1, comprising a communication antenna (28) enabling said transaction with said receiver (40), wherein said card (10) is supplied with electrical power at least in part by an induced current received by said antenna (28) and generated by an electromagnetic field (E) generated by said receiver (40).

5. The microcircuit card (10) according to claim 1, wherein said microcircuit card (10) further comprises:
   a screen (14) for checking information entered by means of said keypad (12).

6. The microcircuit card (10) according to claim 1, wherein the keypad (12) includes keys for entering digits.

7. The microcircuit card (10) according to claim 1, wherein the keypad (12) includes a key (12*a*) for resetting the information entered via the keypad (12).

8. The microcircuit card (10) according to claim 1, wherein the keypad (12) includes a validation key (12*b*).

9. The microcircuit card (10) according to claim 1, wherein said microcircuit card (10) includes a microcircuit (24) including a microprocessor and registers.

10. The microcircuit card (10) according to claim 9, wherein said microprocessor is configured to execute instructions of a program to validate a code entered via said keypad (12), and to authorize execution of a transaction after validation of the code.

\* \* \* \* \*